May 24, 1966 G. S. ALLIN, JR 3,252,546
OPERATOR CAB MOUNTING

Filed Jan. 30, 1964 2 Sheets-Sheet 1

INVENTOR.
GEORGE S. ALLIN, JR.
BY
Andrus & Starke
ATTORNEYS

May 24, 1966  G. S. ALLIN, JR  3,252,546
OPERATOR CAB MOUNTING

Filed Jan. 30, 1964  2 Sheets-Sheet 2

INVENTOR.
GEORGE S. ALLIN, JR.
BY
Andrus & Starke
ATTORNEYS

United States Patent Office 3,252,546
Patented May 24, 1966

3,252,546
OPERATOR CAB MOUNTING
George S. Allin, Jr., Green Bay, Wis., assignor to Northwest Engineering Corporation, Green Bay, Wis., a corporation of Wisconsin
Filed Jan. 30, 1964, Ser. No. 341,270
3 Claims. (Cl. 187—9)

This invention relates to an operator cab mounting and has been applied to the mounting of cabs on power shovels and cranes.

It is often desirable to have the cab at an elevated position for the operator during use of the machine, and to provide for reduction in height at other times. In some instances it is found desirable to provide for operative control of the machine with the operator at different levels.

Heretofore power shovels and cranes, and similar machines have been constructed with the operator cab at a fixed height or position. If the cab is too high for transportation purposes the top and sides of the cab have been made foldable so that they could by folding be lowered or removed, without lowering the seat and control members in the cab.

The present invention provides a simple rapid means of elevating or lowering the cab so that the operator may be positioned at different selected heights within the limits of the elevator mechanism.

In carrying out the invention the entire cab, including the operator's seat, the controls and the housing, is mounted on elevating means which may position the cab by power mechanism at the will of the operator.

The invention is particularly useful in machines controlled by pneumatic and hydraulic means so that the control lines from the cab to the machine are flexible. Where certain of the controls are effected by push-pull rods or links as is generally the case with the right and left drum brakes, the rods may be disconnected before raising or lowering the cab, and different length rods or other compensating means may be employed for different cab positions.

The accompanying drawings illustrate the best mode presently contemplated for carrying out the invention.

Figure 1:
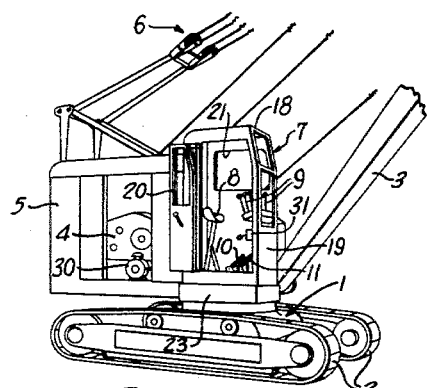
FIGURE 1 is a perspective view of a crawler type crane with the cab operative in its lower position.
Figure 2:
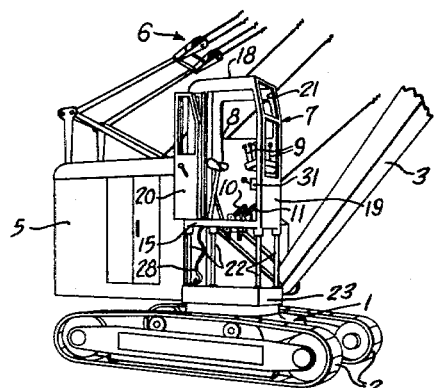
FIG. 2 is a similar view showing the cab raised to an intermediate height.
Figure 3:
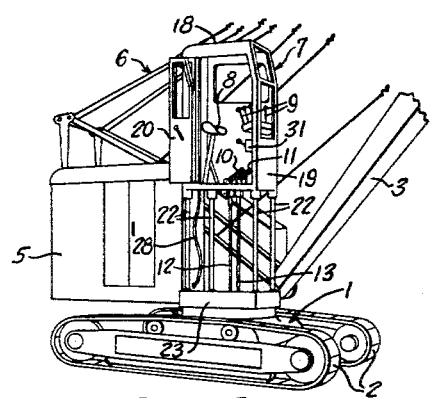
FIG. 3 is a similar view showing the cab raised to its maximum height.
Figure 4:
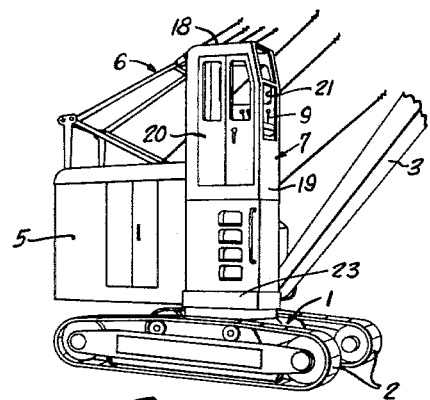
FIG. 4 is a view similar to FIG. 3 with the lower panels in place.
Figures 5, 6:
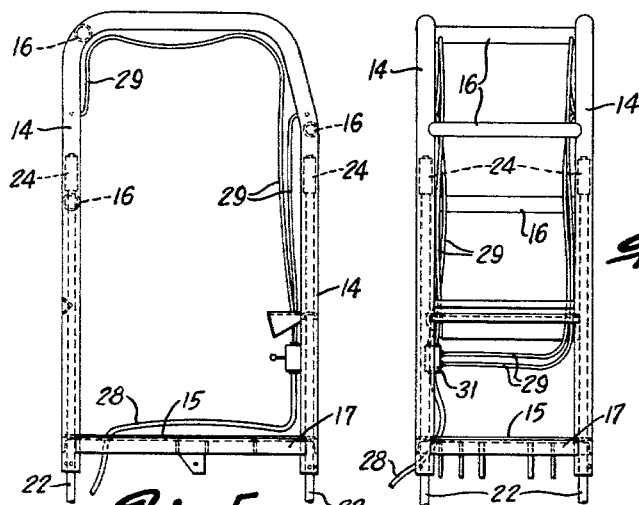
FIG. 5 is a side elevation of the tubular frame for the cab.
FIG. 6 is a front elevation of the frame illustrated in FIG. 5.
Figure 7:
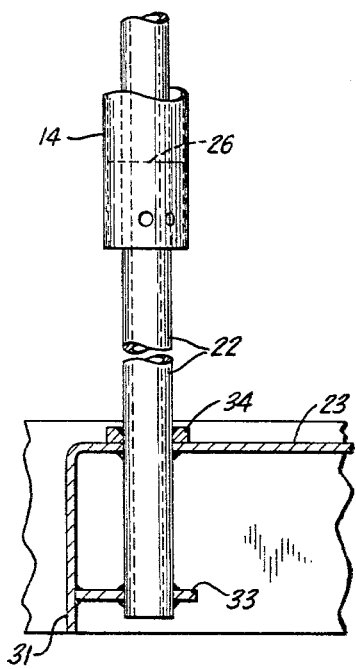
FIG. 7 is a detail section of the support end for the rear piston rods.
Figure 8:
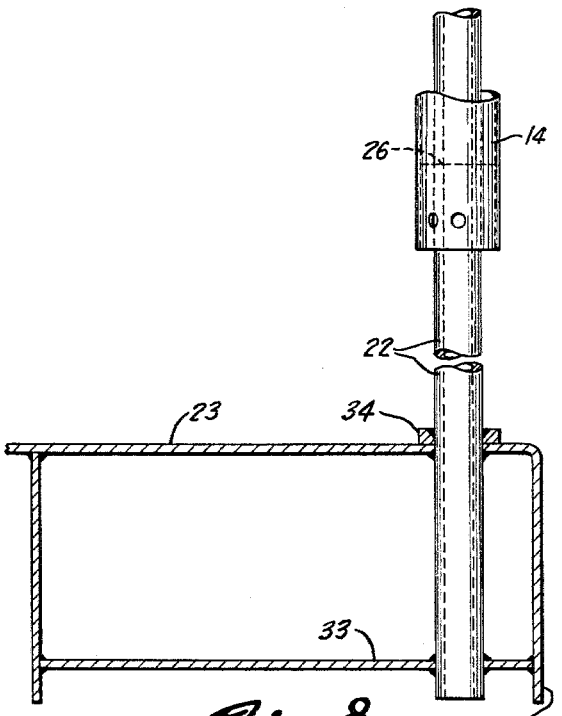
FIG. 8 is a detail section of the support end for the front piston rods.
Figure 9:
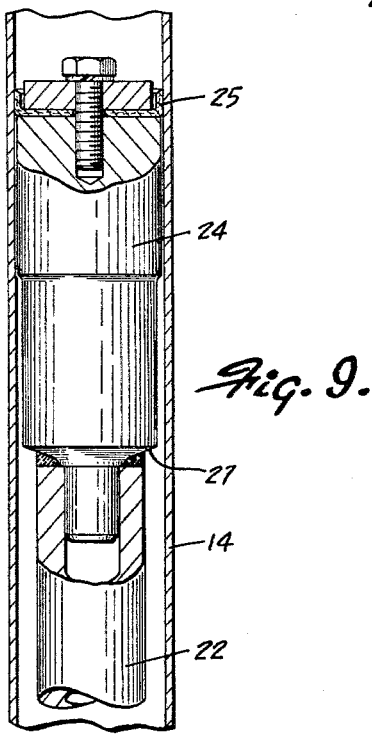
FIG. 9 is a detail section showing the piston in each of the vertical frame members.

The crane illustrated comprises in general the usual base 1 mounted upon a pair of crawlers 2 and having the boom 3 pivoted to the base. A power source 4 is mounted on the base 1 and enclosed in a suitable housing 5 with cable mechanism 6 for actuating the boom 3.

The operator cab 7 is disposed forwardly and to one side of the housing 5 and contains a seat 8 for the operator and a plurality of levers 9 to selectively operate the main clutches, jaw clutches, steering, drum brakes and any other auxiliary controls, not shown in detail.

Most of the controls are actuated by air or hydraulics and consequently the individual levers 9 with certain exceptions merely operate valves in cab 7 and which are connected by flexible tubing to a suitable source of control fluid and to the control mechanism to be actuated. The details of these are standard and therefore not shown here.

In the construction here shown two of the control levers 10 and 11 are connected by fixed links 12 and 13, respectively, to the right hand and left hand drum brakes, not shown, in order to give a positive mechanical actuation of these brakes in preference to depending upon fluid pressure for this purpose.

In carrying out the present invention the entire cab 7 and its contents are mounted for vertical raising and lowering to provide positioning of the operator at a level where his vision is best for the particular work being done.

For this purpose the cab 7 comprises a tubular frame presenting four vertical corner posts 14 which support the top and side paneling for the cab and which preferably extend downwardly through the floor 15 of the cab and support the latter. In the construction illustrated the front and rear vertical posts 14 on each side of the cab are formed integrally of a single extruded metal tube which extends upwardly and across the top in a single piece of inverted U-shaped frame. Suitable cross pieces 16 and 17 secure the two inverted U-shaped frames in spaced relation to determine the size of the cab 7.

The top and side panels 18 and 19 are secured on the frame with one side providing a hinged door 20 for access to the cab by the operator. The side panels 19 may have suitable windows 21 for the operator to view the outside as required.

The entire cab 7 as above described is mounted on four corner posts 22 fixed in a suitable base 23 constituting a part of base 1. The posts 22 extend upwardly in the corresponding tubular corner posts 14 and have pistons 24 at their upper ends which are suitably sealed by cup shaped packings 25 to the inner walls of posts 14.

By making the tubular posts 14 power cylinders and providing for admitting air to the upper ends thereof above pistons 24 it is possible to lift the cab 7 by fluid pressure to any desired height within the limits provided by the operative length of movement of pistons 24 within the corresponding posts 14.

The upper limit of lifting of the cab 7 is determined by a stop 26 in the form of a sleeve surrounding each post 22 and plug welded within the lower end of the corresponding post 14. For this purpose each piston 24 is welded to the upper end of the corresponding post 22 and provides a shoulder 27 which is adapted to abut the stop 26 when the cab 7 is raised to its uppermost position.

The lifting of cab 7 is effected by air pressure in the upper ends of the tubular side frames and which is provided by suitable conduit 28 with branch conduits 29 connected at one end to the corresponding front posts 14 through holes therein. Conduit 28 is connected to a suitable source of air pressure 30 within housing 5. A valve 31 is disposed in conduit 28 in cab 7 at a convenient location for the operator to control the raising and lowering of the cab.

The base portion 23 which supports posts 22 is illustrated as constructed of an inverted pan with downwardly extending side flanges 32 and a cross plate 33 welded to the flanges at the corners for rigidly receiving the lower ends of the corresponding posts 22. The posts 22 extend downwardly through the pan and plates 33 and are welded thereto. A suitable spacer block 34 is provided in the form of a thick washer on each post just above the pan and which serve as an abutment for receiving and supporting the corner frame posts 14 when the cab is lowered to its lowermost position.

In operation the cab 7 may be raised or lowered by first disconnecting the links or rods 12 and 13 and then actuating valve 31 to admit air to the upper end of the cylinders 14 above pistons 24 or releasing air therefrom, as desired.

Different length rods 12 and 13 may be provided to accommodate different positions of cab 7, or some other means may be employed to compensate for the change in length of the mechanical linkage. If the latter is provided it may not be necessary to disconnect the links 12 and 13 when raising or lowering the cab or to replace them.

For transportation purposes the cab 7 will normally be lowered to the position of FIG. 1. In all positions, however, the cab is intact and the operator may actuate the machine and continue to be protected by the cab at all times.

Various modes of carrying out the invention are contemplated as being within the scope of the following claims particularly pointing out and distinctly claiming the subject matter which is regarded as the invention.

I claim:

1. In a machine of the class described, a base having a work boom pivotally mounted thereon and a power source connected to the boom by cables for actuating the same, an operator cab mounted upon said base independently of said boom and containing the control mechanism for the machine, and vertically extendable and contractible cab supporting means to raise and lower said cab upon said base with said control mechanism intact and operable at selected heights for the cab to facilitate observation of the work by an operator in the cab.

2. In a machine of the class described, a base, an operator cab mounted upon said base and containing the control mechanism for the machine, said cab comprising a series of tubular frame members providing vertical corner cylinders closed at the top, said base having vertical posts extending upwardly into the corresponding cylinders and having pistons thereon, and means to raise and lower said cab upon said base with said control mechanism intact and operable at selected heights for the cab, said means comprising fluid pressure means connected to the upper end of said cylinders and means to control the admittance and the escape of fluid pressure to and from said cylinders.

3. In a machine of the class described, a base carrying a cable actuated boom and power means for actuating the same and an operator cab mounted on said base separately from said boom and containing control mechanism for the machine, said cab mounting comprising a frame providing vertical corner posts on said base, a frame for said cab adapted to ride up and down on said corner posts as guides therefor, and means to adjust the vertical position of the cab upon said corner posts to facilitate observation of the work of the machine by the operator in the cab.

References Cited by the Examiner

UNITED STATES PATENTS

| | | | |
|---|---|---|---|
| 2,139,772 | 12/1938 | Ringe | 212—21 |
| 3,080,981 | 3/1963 | Kuschel | 212—28 |
| 3,168,956 | 2/1965 | Jinks | 214—730 |
| 3,172,500 | 3/1965 | Dolphin | 214—730 |

FOREIGN PATENTS 1,281,860  12/1961  France.

HUGO O. SCHULZ, *Primary Examiner.*

A. H. NIELSEN, *Examiner.*